Sept. 20, 1960     E. C. SCHNEIDER     2,953,783
CONICAL SCAN DIRECTION FINDER
Filed March 22, 1945
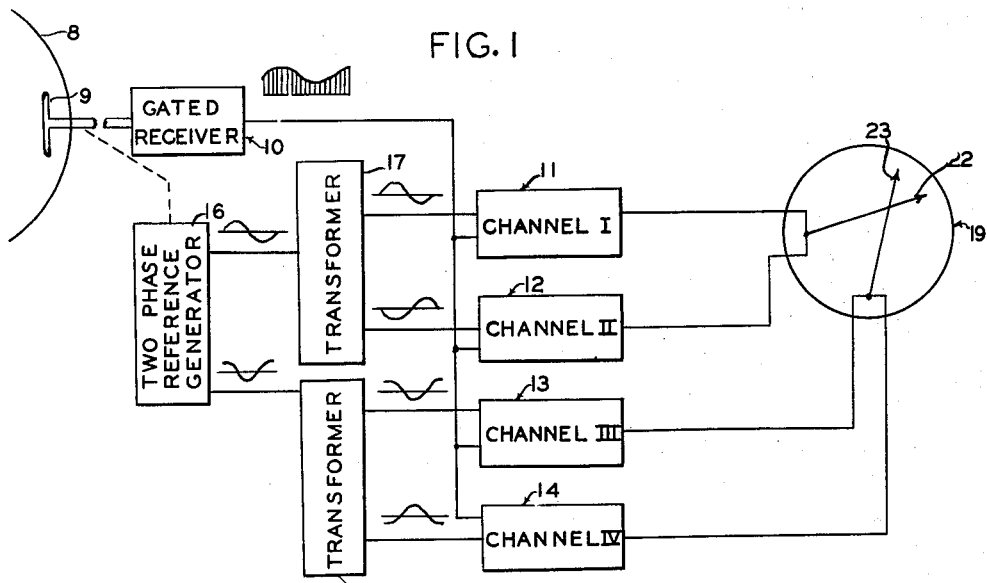
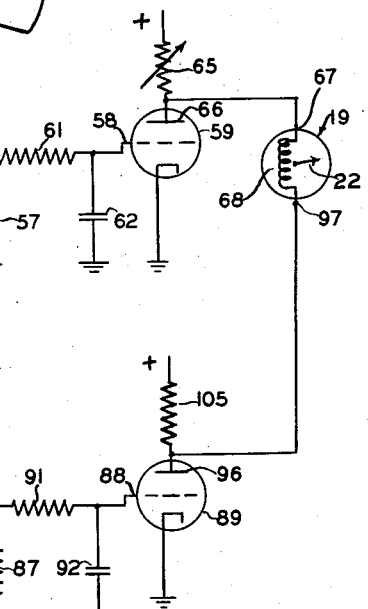
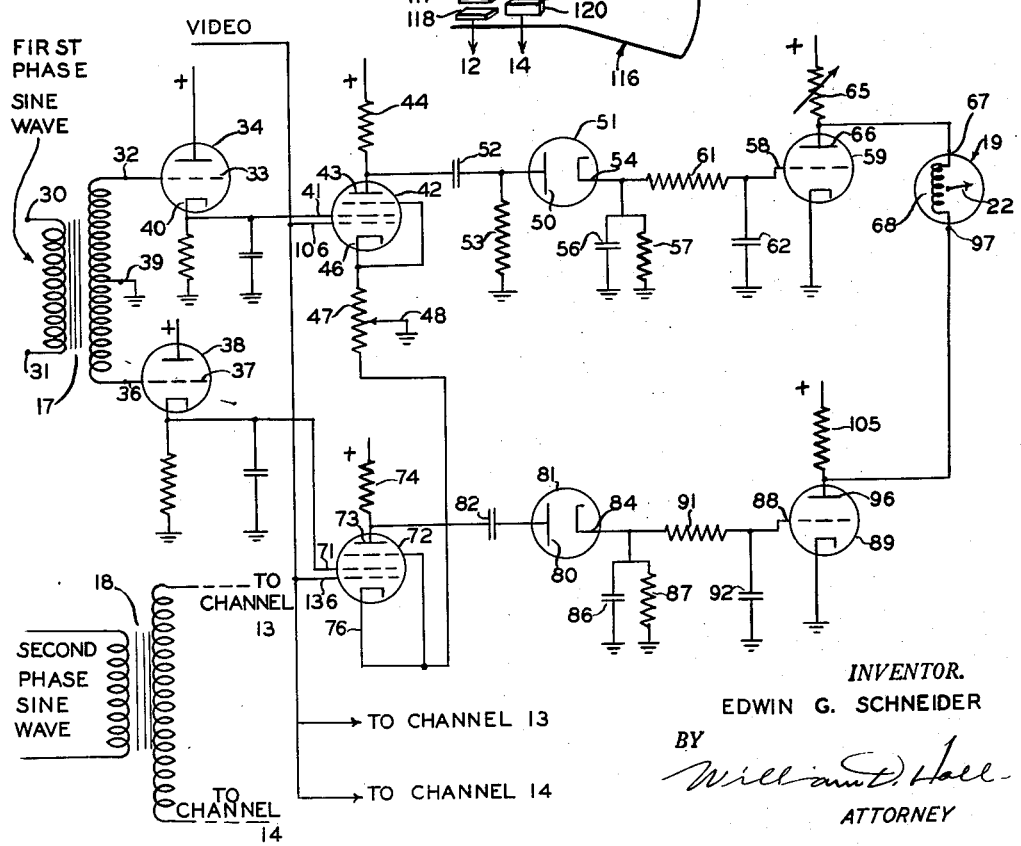
INVENTOR.
EDWIN G. SCHNEIDER
BY
William D. Hall
ATTORNEY

United States Patent Office 2,953,783
Patented Sept. 20, 1960

2,953,783

CONICAL SCAN DIRECTION FINDER

Edwin G. Schneider, Watertown, Mass., assignor, by mesne assignments, to the United States of America as represented by the Secretary of War Filed Mar. 22, 1945, Ser. No. 584,235

14 Claims. (Cl. 343—118)

This invention relates to an electrical system and more particularly to a radio system.

It is desirable in some radio applications to be able to point the axis of an antenna at a given object or target in space. The need for this most commonly arises in connection with radio pulse echo position finders. In order to point the antenna at a target it is necessary to known the direction of the axis of the antenna with respect to the target. This information may be obtained optically by means of a telescope mounted on the antenna if the target is visible. An electrical means, however, may be located at a remote point and is independent of the visibility of the target and is, therefore, more desirable.

It is an object of this invention, therefore, to present a system for indicating electrically the position of the axis of an antenna with respect to a given object or target.

In accordance with the present invention, there are provided an antenna and a generator to generate reference voltages. This reference generator is mechanically coupled to a rotating feed element of the antenna. Transformers are provided for obtaining two voltages 180 degrees out of phase from each of two outputs from the reference generator. A receiver is associated with the antenna for converting echoes from the target into video pulses. A plurality of error detecting channels compare the video pulses from the receiver with the reference voltages obtained from the transformers. The output of the error detecting means is applied to suitable indicating means or a suitable antenna positioning means.

For a better understanding of the invention, together with other and further objects thereof, reference is had to the following description, taken in connection with the accompanying drawings, and the scope of the invention will be pointed out in the appended claims.

In the accompanying drawings:

Fig. 1 is a block diagram of the invention;

Fig. 2 is a schematic diagram of two channels of the invention; and

Fig. 3 is a schematic diagram of an indicator that may be employed in the circuit of Fig. 2.

Referring now more particularly to Fig. 1 of the drawings, there is shown in block diagram form the circuit arrangement of the invention including an antenna comprising a reflector 8 and a rotating feed element 9. As referred to hereinbelow, the rotating radiator element 9 is effective in producing a so-called conical scan, that is, the highly directive beam is disposed at an angle with reference to the axis of the stationary reflector 8. The feed element 9 rotating about such axis feeds received signals to a gated receiver 10. This gated receiver feeds four error signal detector channels 11, 12, 13 and 14. A two phase sine wave reference generator 16 is mechanically coupled to the rotating antenna element 9 in such a manner that generator 16 makes one revolution for every revolution of antenna element 9. Preferably generator 16 is so constructed that each output reference voltage completes one cycle of a sine wave for each revolution of the generator. The output of the two phase generator is fed to two transformers 17 and 18. The output of transformer 17 is fed to error signal detector channels 11 and 12 while the output of transformer 18 is fed to channels 13 and 14. The outputs of all four error signal detector channels 11, 12, 13 and 14 are fed to a cross-pointed meter 19. This meter 19 has a pointer 22 that is driven by channels 11 and 12 and a second pointer 23 that is driven by channels 13 and 14.

Referring now to Fig. 2, there is shown schematically channels 11 and 12, transformers 17 and 18, and meter 19. One phase of the reference voltage from generator 16 of Fig. 1 is fed to terminals 30 and 31 of transformer 17. A terminal 32 of transformer 17 is connected to grid 33 of vacuum tube 34 and terminal 36 of transformer 17 is connected to grid 37 of vacuum tube 38. The center tap 39 of transformer 17 is grounded. Vacuum tubes 34 and 38 are connected as conventional cathode followers. Cathode 40 of tube 34 is connected to a grid 41 of vacuum tube 42. Anode 43 of tube 42 is connected to a plate load resistor 44 which is, in turn, returned to a source of B+ potential. Cathode 46 of tube 42 is connected to one end of resistor 47. A movable tap 48 on resistor 47 is maintained at ground potential. Anode 43 of tube 42 is connected to anode 50 of vacuum tube 51 by means of a coupling circuit made up of capacitor 52 and resistor 53. Cathode 54 of tube 51 is connected to ground through a detector load made up of capacitor 56 and resistor 57 arranged in a parallel combination. Cathode 54 is also connected to grid 58 of tube 59 by resistor 61. A capacitor 62 is connected between grid 58 and ground. Tube 59 is connected as a conventional amplifier except that plate load resistor 65 is variable. Anode 66 of tube 59 is connected to terminal 67 of meter coil 68. Meter coil 68 drives pointer 22. The channel made up of vacuum tubes 72, 81 and 89 is substantially the same as the channel made up of vacuum tubes 42, 51 and 59 and like parts in the second channel are given numbers exactly 30 higher than corresponding parts in the first channel. The only difference in the two channels is that plate load resistor 105 in the second channel is shown as a fixed resistor while resistor 65 in the first channel was described as variable. The video signals from the receiver 10 of Fig. 1 are fed to grid 106 of tube 42 and grid 136 of tube 72.

Referring now to the operation of the system, when a sine wave voltage from the reference generator 16 of Fig. 1 is impressed on terminals 30 and 31 of transformer 17 two sine wave voltages differing in phase by 180 degrees are obtained from the secondary of transformer 17. One of these voltages appears between terminals 32 and 39 and the other voltage appears between terminals 36 and 39. Cathode follower tube 34 acts as a buffer for the reference generator 16 and as a low impedance source to drive grid 41 of tube 42. The sine wave applied to grid 41 causes the plate current in tube 42 to be cutoff for more than one-half a cycle of the sine wave. When the tube is not cutoff it will amplify the video signals applied at grid 106. The amount of amplification will depend on the potential of grid 41 at the instant a video signal is returned. The amplified video signals are applied to vacuum tube 51 which acts as a detector. The detector output is fed through a coupling circuit made up of resistor 61 and capacitor 62. This coupling circuit acts as a filter so that the input to grid 58 is a substantially steady, unidirectional voltage. The magnitude of this voltage depends upon the amplitude of the video signals applied to anode 50 of tube 51. Tube 59 acts as a direct current amplifier so that the potential on grid 58 determines the potential of anode 66 which, in turn, determines the potential of terminal 67 of meter coil 68.

In a similar manner the sine wave from terminal 36 is fed through cathode follower 38 to grid 71 of tube 72. The video signals are fed in at grid 136 of tube 72. The amplified video signals are applied to detector tube 81 and the output of detector 81 is fed to a direct current amplifier tube 89. The potential of grid 88 determines the potential of anode 96 which in turn determines the potential of terminal 97 of meter coil 68.

Suppose now that no signals are applied to grids 106 and 136 of tubes 42 and 72. If this is true, the potentials on grids 58 and 88 of tubes 59 and 89 are equal and the potentials at terminals 67 and 97 of meter coil 68 are equal. Therefore, under these conditions, meter pointer 22 is in the center of the scale. If the pointer is off center due to any slight misadjustments existing in the circuit it may be centered by adjusting resistor 65.

This circuit is to be operated with a radio object location type direction finder set using a conical scan, and receiver 10 of Fig. 1 will be so gated that the echoes from only one target will be applied to grids 106 and 136 of tubes 42 and 72. If the axis of the reflector 8 associated with antenna 9 of Fig. 1 is pointed directly at the source of the incoming signal, the video signal in the output of receiver 10 will have a constant amplitude. If, however, said axis is not pointed exactly at the target or source of signals, the video signals in the output of receiver 10 will be amplitude modulated. The modulation envelope will be substantially sinusoidal and have a frequency equal to the rate of rotation of the antenna. The phase of the modulation envelope will be a function of the direction of deviation of the axis of the conical scan from the direction of arrival of the incoming signal. A conical scanning antenna is shown in U.S. Patent 2,083,242, July 1937, issued to W. Runge. The conical scanning antenna illustrated in the drawing of the present invention differs from that shown by Runge in that the feed element 9 rotates instead of the reflecting element.

Assume now that the axis of the reflector 8 is pointed directly at the target so that the amplitudes of the video signals applied to grids 106 and 136 are constant. If this is the case, the outputs of detector tubes 51 and 81 are equal. This, in turn, means that the pointer 22 on meter 19 is still in the center of the scale. If the meter pointer 22 is not centered it may be centered by moving tap 48 on resistor 47. The portion of resistor 47 between tap 48 and cathode 46 introduces cathode degeneration into the stage containing tube 42 and therefore reduces the gain of that stage. In a similar manner the portion of resistor between tap 48 and cathode 76 reduces the gain of the stage containing tube 72. Adjusting tap 48 adjusts the gain of the two stages so that the meter pointer is centered.

Now assume that the axis of reflector 8 is moved off the target so that the modulation envelope of the video signals is in phase with the sine wave applied to grid 41 of tube 42. It will be understood by those skilled in the art that this will cause the output of tube 42 to increase and the output of tube 72 to decrease. The result of this will be that the ouput of detector 51 increases and grid 58 becomes more negative at the same time that the output of detector 81 decreases and grid 88 becomes less negative. This causes anode 66 of tube 59 to rise in potential and anode 96 of tube 89 to drop in potential. A potential difference now exists across meter coil 68, terminal 67 being the more positive terminal, and terminal 97 being the more negative terminal. This will cause meter pointer 22 to be deflected from the center of the scale by an amount determined by the magnitude of the potential difference across coil 68. It is obvious that the direction of deflection of the meter pointer 22 will be reversed if the reflector 8 is moved so that the modulation envelope is in phase with the voltage applied to grid 71.

If the reflector 8 is moved in such a direction that the modulation envelope is 90 degrees out of phase with the voltages applied to grids 41 or 71 the average outputs of the detectors 51 and 81 will be equal and the pointer 22 will not be deflected. If the reflector is moved so that the modulation envelope is out of phase with either grid 41 or grid 71 by an electrical angle that is between 0 degree and 90 degrees, the modulation envelope of the target echo signals may be resolved into two sine wave components, one component in phase with the voltage on grid 41 or grid 71 which will cause pointer 22 to move and one component 90 degrees out of phase with the voltage on grid 41 or grid 71 which will not affect pointer 22. If the phase of the voltage from the reference generator 16 of Fig. 1 is so adjusted that the modulation envelope is in phase with either the voltages on grid 41 or grid 71 when the reflector 8 is pointed at the target in a horizontal plane but is moved above or below it in elevation, pointer 22 may be used to indicate the error in pointing in elevation. The phase may also be adjusted so that the pointer 22 may be made to move in an upward direction when the axis of reflector 8 is above the target and move in a downward direction when the axis of reflector 8 is below the target. The action of the circuit may be summarized as follows: Channels 11 and 12 of Fig. 1 compare the amplitude of signals received by antenna element 9 when the axis of the beam is at two points 180 degrees apart in space. If the amplitude of the signals from the two positions of the axis are equal the pointer 22 of meter 19 does not move. If the signals are unequal, pointer 22 moves in a direction to indicate the direction from which the larger of the two signals is received.

If a second voltage is obtained from reference generator 16 ninety degrees out of phase with the voltage applied to transformer 17, two similar channels could be used to indicate errors in pointing in a plane 90 degrees away from the plane covered by the first two channels. In this example the second two channels would indicate errors in pointing in azimuth.

If the two meter pointers 22 and 23 are mounted as shown in Fig. 1 the meter 19 may be so connected so that the direction of the intersection of pointers 22 and 23 from the center of the scale indicates the direction of the pointing error. The cross pointed meter 19 may be replaced by other suitable indicating means for example a cathode ray tube, but the meter 19 offers an advantage in that it has an integrating action that tends to smooth out any rapid variations in the output of the error signal detector channels.

Figure 3 illustrates the connections from the error channels to a cathode ray tube indicator 116. Connections are made from the vertical deflection plates 117 and 118 to the output of error channels I and II respectively. These channels are represented in Figure 3 by reference numerals 11 and 12. In a similar manner, connections are made from the horizontal deflection plates 119 and 120 to the output of error channels III and IV respectively. These channels are represented in Figure 3 by the reference numerals 13 and 14. The remaining connections to cathode ray tube 116 are conventional and, for this reason, are not shown in Figure 3. Again, the position of the spot with respect to the center of the screen will indicate the pointing error of reflector 8.

The output of the error detecting channels 11, 12, 13 and 14 may be used as control voltages for an automatic antenna positioning system in addition to being used to drive an indicating means.

From the above description it will be evident that in accordance with the present invention, in a radio direction finder of the type which employs a conical scanning antenna having a direction axis and which employs a plurality of sinusoidal reference potentials synchronous with the scanning rate for separating the signals recurrently received during a corresponding plurality of successive intervals of the scanning cycle into a corresponding plurality of signal channels means are included in each of the channels for producing a unidirectional potential representing the average amplitude of the signals received therein comprising in each case means for rectifying the signals, detectors 51 and 81, means for integrating the rectified signals, resistor 61, condenser 62 and resistor 91, condenser 92, and means operatively responsive to the outputs of all of the channels for indicating a point in a reference area which represents the amount and direction of the error in the alignment of the direction axis relative to the direction of the arrival of the signals.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for indicating the direction of the axis of an antenna with respect to the direction of arrival of a received signal, said system comprising an antenna including a rotating element for producing a conical scan about said axis; a receiver coupled to said antenna; a two-phase reference generator means coupled to said rotating element and adapted to rotate therewith; a plurality of phase changing means; means for applying the output of said generator means to said phase changing means; a plurality of means for detecting the modulation of the signals received by said receiver, each of said detecting means comprising a first amplifier means jointly responsive to the output of said phase changing means and said receiver means, a detector means responsive to the output of said first amplifier means, a second amplifying means, an integrating circuit coupling said detector means to said second amplifier means; and an indicating means responsive to the outputs of said second amplifier means.

2. A system for indicating the direction of the axis of an antenna with respect to the direction of arrival of a received signal, said system comprising an antenna including a rotating element for producing a conical scan about said axis; a receiver coupled to said antenna; a two-phase reference generator means coupled to said rotating element and adapted to rotate therewith; a plurality of means for detecting the modulation of signals received by said receiver means for applying the outputs of said generator means to said detecting means, each of said detecting means comprising a first amplifier means coupled to said receiver means, a detector means responsive to the output of said first amplifier means, a second amplifying means, an integrating circuit coupling said detector means to said second amplifier means; and an indicating means responsive to the outputs of said second amplifier means.

3. A system for indicating the direction of the axis of an antenna with respect to the direction of arrival of a received signal, said system comprising an antenna including a rotating element for producing a conical scan about said axis; a gated receiver associated with said antenna; a two-phase reference generator means coupled to said rotating element and adapted to rotate therewith; a plurality of phase changing means; means for applying the output of said generator means to said phase changing means; a plurality of means for detecting the modulation of the signals received by said receiver, each of said detecting means comprising a first amplifier means responsive to the output of said phase changing means and said receiver means, a detector means responsive to the output of said first amplifier means, a pair of second amplying means, an integrating circuit coupling said detector means to said second amplifier means, and means for controlling the gain of said first and said second amplifier means in at least one said detecting means; and an indicating means responsive to the outputs of said pair of second amplifier means.

4. A system for indicating the direction of the axis of an antenna with respect to the direction of arrival of a received signal, said system comprising an antenna including a rotating element for producing a conical scan about said axis, a receiver coupled to said antenna, reference generator means coupled to said rotating element and adapted to rotate therewith, a plurality of modulation detecting means, phase changing means for applying the outputs of said generator means to said detecting means, each of said detecting means comprising a first amplifier means coupled to an output of said phase changing means and said receiver means, a detector means responsive to the output of said first amplifier means, a second amplifier means, an integrating circuit coupling said second amplifier means to said detector means and an indicating means responsive to the output of said second amplifier means.

5. Apparatus in accordance with claim 4 in which said indicating means comprises a cross-pointer meter.

6. In a system for indicating the position of the axis of an antenna with respect to the direction of arrival of a received signal, comprising an antenna, a receiver coupled to said antenna, means for causing the beam from said antenna to conically scan at a predetermined frequency, means for generating a first reference wave at said scanning frequency, means for generating a second reference wave at said scanning frequency, said second reference wave having a predetermined fixed phase relationship to said first reference wave, a plurality of means for detecting the modulation of signals received by said receiver, each comprising an amplifier responsive jointly to the output of said receiver and one of said reference waves, and each of said modulation detecting means further comprising a detector means responsive to the output of said amplifier means, an integrating circuit coupled to the output of said detector means to provide unidirectional voltage having an amplitude indicative of the position of the axis of said antenna with respect to the direction to said target.

7. In a system for indicating the angle between the axis of an antenna and direction of arrival of a signal comprising a directional antenna for receiving energy included within a narrow beam, a receiver coupled to said antenna, means for causing the directive pattern of said antenna to conically scan at a predetermined frequency, means for generating a first reference wave at said scanning frequency, means for generating a second reference wave in phase opposition to said first wave, a first means for detecting the modulation of signals received by said receiver comprising a first amplifier responsive jointly to the output of said receiver and said first wave, and a first detector responsive to the output of said first amplifier, a first integrating circuit responsive to the output of said first detector to provide a first unidirectional voltage, a second signal modulation detecting means comprising a second amplifier responsive jointly to the output of said receiver and said second wave, a second detector responsive to the output of said second amplifier, a second integrating circuit responsive to the output of said second detector to provide a second unidirectional voltage, and means for indicating the magnitude and polarity of the difference in the amplitude of said first and said second unidirectional voltages.

8. In a radio locating system, a directive antenna and means for causing the directive pattern of said antenna to conically scan a sector in space at a predetermined frequency, a system for indicating the angle between the axis of said directive pattern and direction of arrival of a signal, said system comprising means for generating four alternating voltage signals successively in phase quadrature and having a frequency equal to the scanning frequency of the beam from said antenna, alternate pairs of said voltages being in phase opposition, a receiver coupled to said antenna means to receive signals therefrom, four means for detecting the modulation of the signals received by said receiver each comprising an amplifier responsive jointly to the output of said receiver and said respective generated signal, and a detector responsive to the output of said respective amplifier, each of said detectors providing a respective unidirectional voltage, wherein the difference between alternate pairs of said unidirectional voltages is indicative of the position of the axis of said antenna with respect to the direction of arrival of said signal.

9. A system in accordance with claim 8 said system further comprising a cross-pointer meter, said meter having a first pointer thereof responsive to the difference between unidirectional voltages from one pair of alternate signals, and a second pointer thereof responsive to the difference between unidirectional voltages from the other pair of alternate signals.

10. In a radio direction finding receiver of the type which employs a conical scanning antenna having a direction axis and which employs a plurality of sinusoidal reference potentials synchronous with the scanning rate for separating the signals recurrently received during a corresponding plurality of successive intervals of the scanning cycle into a corresponding plurality of signal channels; means for detecting the modulation of the signals in the respective channels including in each of said channels means for producing a unidirectional potential representing the average amplitude of the signals received therein comprising in each case means for rectifying said signals, means for integrating said rectified signals, and means operatively responsive to the outputs of all of said channels for indicating a point in a reference area which represents the amount and direction of the deviation in the alignment of the direction axis relative to the direction of arrival of the signals.

11. The invention as described in claim 10 wherein said indication means is a meter having two pointers which intersect at said point.

12. A directional radio system comprising a directive antenna having a movable element for producing a motion of the directional pattern thereof, a receiver coupled to said antenna, a reference signal generator coupled to said rotatable element for producing a cyclical signal synchronized with said motion, and an error detection channel comprising a pair of electron tubes having their inputs coupled in parallel to the output of said receiver, means for applying said cyclical signal to said tubes to alternately drive them to cutoff, means for separately detecting the outputs of said tubes to derive the modulation envelopes produced in a received signal due to said motion of said directional pattern, integrating means for separately integrating said envelopes to provide direct current potentials having magnitudes which are dependent upon the amplitudes of said modulation envelopes, and a control means coupled to said integrating means and responsive to the difference in the magnitudes of said potentials.

13. A system as set forth in claim 12, wherein said movable element causes a conical scan of said directional pattern, means for deriving from said reference signal generator a second cyclical signal which is in quadrature with the first-mentioned cyclical signal, a second error detecting channel identical to the first-mentioned error detecting channel and controlled by said second cyclical signal, and means responsive to the control means in both channels.

14. A system as set forth in claim 13, wherein the last named means comprises an indicator having first and second orthogonally related indication control means, said first means being coupled to the output of one channel and said second means being coupled to the output of said second channel.

References Cited in the file of this patent

UNITED STATES PATENTS

| | | |
|---|---|---|
| 2,083,242 | Runge | June 8, 1937 |
| 2,277,464 | Taylor | Mar. 24, 1942 |
| 2,314,093 | Landon | Mar. 16, 1943 |
| 2,360,810 | Carlson et al. | Oct. 17, 1944 |
| 2,369,132 | Browder et al. | Feb. 13, 1945 |
| 2,409,456 | Tolson | Oct. 15, 1946 |
| 2,417,248 | Godet | Mar. 11, 1947 |
| 2,419,567 | Labin | Apr. 29, 1947 |
| 2,422,068 | Bedford | June 10, 1947 |
| 2,424,193 | Rost et al. | July 15, 1947 |
| 2,426,182 | De Lange | Aug. 26, 1947 |
| 2,427,905 | Fyler | Sept. 23, 1947 |
| 2,438,947 | Rieke et al. | Apr. 6, 1948 |
| 2,459,117 | Oliver | Jan. 11, 1949 |
| 2,464,822 | Mallett | Mar. 22, 1949 |
| 2,473,175 | Ridenour | June 14, 1949 |
| 2,514,351 | Smith | July 4, 1950 |

FOREIGN PATENTS

| | | |
|---|---|---|
| 526,658 | Great Britain | Sept. 23, 1940 |
| 540,681 | Great Britain | Oct. 27, 1941 |